Figure 1:
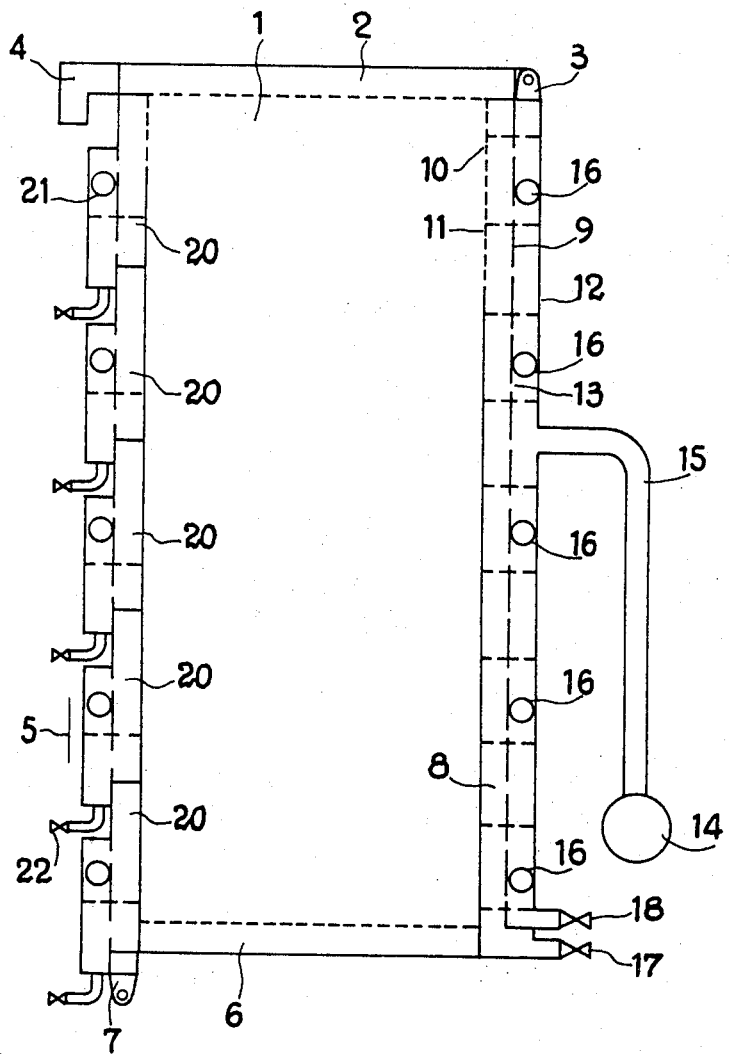

United States Patent [19]
Buchmann

[11] 3,802,815
[45] Apr. 9, 1974

[54] MOULDING BOX FOR PRODUCING MOULDED STRUCTURES OF EXPANDED THERMOPLASTIC MATERIAL

[75] Inventor: Rudolf Christian Buchmann, Mannheim-Feudenheim, Germany

[73] Assignee: Pont-A-Mousson S.A., Nancy, France

[22] Filed: May 22, 1972

[21] Appl. No.: 255,490

[30] Foreign Application Priority Data
May 25, 1971 Germany............................ 2125742

[52] U.S. Cl................................... 425/4, 425/817
[51] Int. Cl............................................. B29d 27/00
[58] Field of Search................................ 425/4, 817

[56] References Cited
UNITED STATES PATENTS

| | | | |
|---|---|---|---|
| 3,200,175 | 8/1965 | Harrison | 425/817 X |
| 3,704,081 | 11/1972 | Immel | 425/4 |
| 3,235,908 | 2/1966 | Thompson | 425/4 |
| 3,452,124 | 6/1969 | Knapp | 425/4 X |

Primary Examiner—R. Spencer Annear
Assistant Examiner—Mark Rosenbaum
Attorney, Agent, or Firm—Sughrue, Rothwell, Mion, Zinn & Macpeak

[57] ABSTRACT

Moulding box for moulding particles of expansible thermoplastic material. The box comprises: wall structures defining a mould cavity and vertical wall structures of the wall structures each comprises an outer wall and inner wall defining a chamber. The inner wall has apertures for passage of steam into the thermoplastic material and the outer wall has steam inlets and outlets for water of condensation. A partition wall having openings is interposed between the inner and outer walls to constitute a distributor for the steam and a baffle for the water of condensation.

In one embodiment, the wall structure consists of a plurality of extruded hollow section members each of which has a partition wall acting as a steam distributor and condensation water baffle.

1 Claim, 2 Drawing Figures

MOULDING BOX FOR PRODUCING MOULDED STRUCTURES OF EXPANDED THERMOPLASTIC MATERIAL

The present invention relates to a moulding box for producing preferably plane large structures of expanded plastics material, such as slabs or blocks from pre-expanded thermoplastic materials in the form of fine particles which are welded or agglomerated into a homogeneous mass in hollow moulds by injection of superheated steam through hollow walls which are entirely or partially apertured or split adjacent the moulding mass, the mass being stripped from the mould after cooling.

The invention more particularly relates to the special arrangement of elements for injecting the steam into the moulding mass and discharging the undesirable condensation of water formed.

It is known that moulded structures of the aforementioned type may be produced by the injection of steam superheated to a temperature between 100° and 180°C in a moulding box whose walls are constituted by hollow chambers. The steam is supplied by way of nozzles connected to the outer walls of the mould; about 15 nozzles having a diameter of 1 inch are provided on one lateral wall and supplied with steam from a main pipe, for example having a diameter of 150 mm, which roughly distributes the steam, for example in a mould for producing a block measuring 5,000 × 1,250 × 500 mm. In order to ensure a suitable distribution of the steam, for example supplied under a presure of 1.8 atmosphere, in the hollow chamber, and to ensure that this steam does not flow only through the apertures in the vicinity of the distributing passages of access, it will be necessary that the apertures in the inner wall through which the steam must be directed into the moulding mass be chosen, as concerns their number and section with respect to that of the supply pipe, in such manner that a pressure may be established as easily as possible in the chamber.

However, opposing this requirement there is another practical requirement, namely that the number and the section of the apertures or openings must be chosen to be as large as possible to enable the mixture of steam, gas and water of condensation which are under pressure in the moulding mass after formation of the latter to escape through the apertures by way of the fine passages existing between the welded particles.

The resulting advantage is that the duration of the cooling may be notably shortened and brought for example from 20 minutes to 6 to 8 minutes for a block having a specific weight of 15 kilograms/sq.meter.

Consequently, it would be desirable to be in a position to choose the number of the apertures and the total section of the apertures independently of the question of the uniform distribution of the steam. As a result of research based on this observation it has been found that a very good distribution of the steam throughout the surface of the wall of the mould may be obtained independently of the apertures in the inner wall of the mould if there is provided, between the inner wall and the outer wall of the mould, a partition wall which is provided with openings and performs the function of a steam distributor.

Consequently, an object of the invention is to provide a single or multiple moulding box for producing one or a plurality of moulding structures from expansible thermoplastic materials in the form of small particles which are welded or agglomerated into a homogeneous mass by heating them to their softening point, or above said point, by means of the injection into the moulding mass of steam which is superheated and has a low content of water of condensation, by employing moulding walls having hollow chambers provided with apertures facing the cavity of the mould, wherein, at least in respect of the vertical wall structure of the moulding box, there is provided between the inner wall of a chamber, which is separated by a spacer frame and which forms a hollow chamber and is provided in the known manner with apertures opening onto the cavity of the mould for the injection of steam, and the outer wall of the chamber which comprises at least a steam inlet and an outlet for water of condensation or between separate parts of said walls, a third wall provided with openings whose dimensions are chosen in such manner that said third wall performs between the two chambers or parts of chambers that it separates the function of both a distributor for the steam supplied to the outer chamber and a baffle for the water of condensation.

Such a partition wall renders compatible the two aforementioned contradictory requirements, namely a uniform distribution of the steam throughout the surface of the wall of the mould and an outlet section of the apertures in the inner wall which is as large as possible. Owing to this arrangement, the apertures in the median or partition wall may be chosen in an ideal manner with respect to the desired section of the steam supply nozzles, bearing in mind that in certain cases it is desirable to vary this section, for example by masking the apertures by means of a shutter to suit the various types of moulding materials which may require a different treatment with steam.

Another advantage of this arrangement resides in the possibility of eliminating the outer distributor pipes which were heretofore necessary for reducing the cooling of the steam, by employing the second chamber which is located on the opposite side of the partition wall to the moulding cavity as a distributor pipe. In an advantageous manner, the section of this chamber is so chosen that the connection or connections from the main pipe are fixed on the front face of the chamber. The advantage of this arrangement is that the flow of the steam may be directed in a direction parallel to the distributor openings and that the water of condensation which forms may be discharged at the end of the chamber, whereas the pressure rises in a regular manner in the direction opposed to that of the flow of the steam, this steam flowing into the front chamber with an even distribution by way of the openings in the intermediate wall and thence into the moulding cavity through the apertures. A further advantage resides in the fact that there is a reduction in the formation of water of condensation owing to the fact that the intermediate wall is preheated on its rear face, the water of condensation which forms being thus directed into the rear chamber. It has been found advantageous to adapt the dimensions of the double elements to those of the pipes which are desired to be made as small as possible and to assemble, for example, instead of a mould wall having a chamber of 6,000 × 1,250 × 30 mm, five double elongated elements of 6,000 × 250 × (2×30) mm. With such an arrangement, the main distributor pipe having a diameter of 150 mm which was heretofore necessary may be replaced by five direct connections of 51 mm.

In an advantageous manner, for producing one of the walls of the mould it is possible to employ a hollow section member which is moulded by extrusion and in which is inserted a partition wall provided with openings. The partition walls are preferably held in position at points or surfaces both on the inner wall and on the outer wall. The supporting surfaces are preferably also provided with openings so as to allow a free passage to the steam admitted into the chambers. Preferably, the double chamber element formed by a hollow section member is connected to another chamber for discharging the water of condensation. In a particularly advantageous embodiment, a plurality of hollow section members may be juxtaposed or superimposed so as to constitute a wall.

Further features and advantages of the invention will be apparent from the ensuing description with reference to the accompanying drawings.

Figure 2:
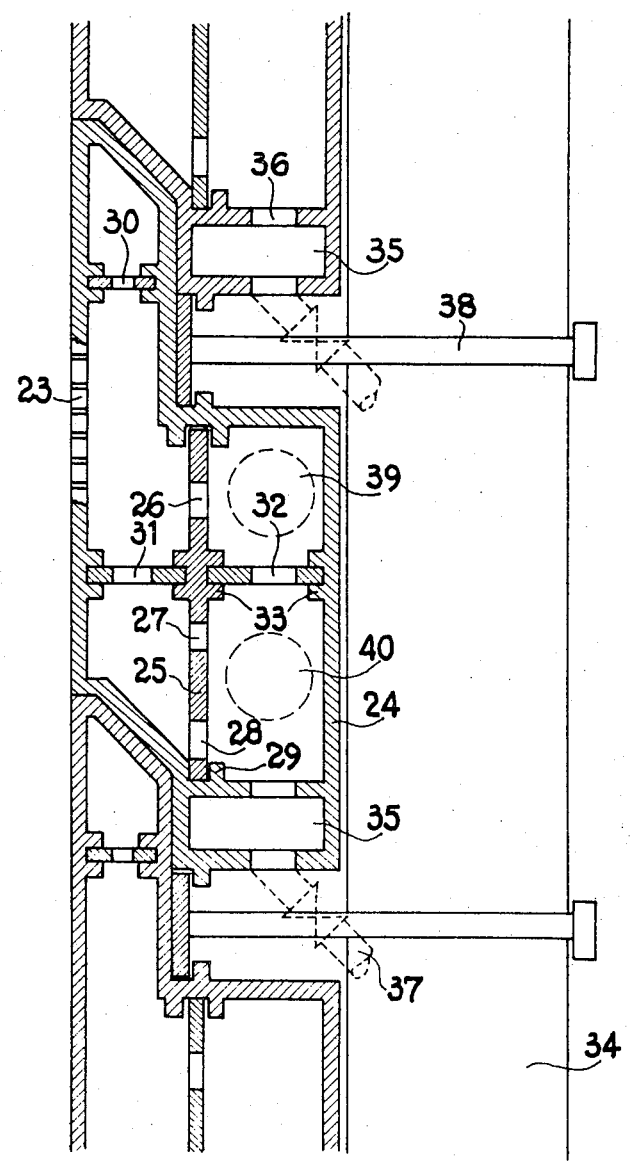

In the drawings:

FIG. 1 is a sectional view of a moulding box according to the invention for producing rectangular blocks of expanded polystyrene, for example having a length of 6,000 mm, a height of 1,250 mm and a width of 500 mm, in which box the vertical wall structure on the right is divided into two chambers by a vertical distributing wall, whereas the vertical wall structure on the left is constituted by a plurality of superimposed elements having a double chamber, and FIG. 2 is a sectional view of an element of the left wall structure which consists of a hollow section member of drawn aluminium in which is inserted a partition and support wall.

The mould box shown in FIG. 1 has a cavity 1 in which are poured the expansible particles and a cover 2 which is pivotally connected to the mould 2 by means of a hinge 3 and is provided with a closing lock 4 which maintains the cover and a vertical wall structure 5 assembled during the forming or moulding of the mass of moulding material. It further comprises a bottom wall 6, to which the lateral wall structure 5 is pivoted by a plurality of hinges 7, and a second vertical lateral wall structure 8 rigidly secured to the bottom wall 6.

The front and rear sides of the moulding box are respectively closed by a vertical pivotable door and a fixed rear wall (not shown). Between the inner wall 11 of the second wall structure 8 of the mould, which wall is provided with apertures 10, and its outer wall 12 there is disposed a distributing wall 9. Arranged on the area of the wall 9 are openings 13 for a prior distribution of the steam which is introduced either by way of pipes 14 and 15 or by way of pipes 16 connected to the front face of the wall structure 8. The water of condensation issues by way of outlets 17 from the front chamber and outlets 18 from the rear chamber. The first vertical lateral wall structure 5 consists of five superimposed elements 20 having a double chamber each of which chambers is provided with a steam inlet 21 and an outlet 22 for the water of condensation.

FIG. 2 shows an element having a double chamber having a height of, for example, 250 mm. This element comprises an apertured wall 23 facing the moulding mass, an outer wall 24 and an intermediate distributing wall 25 in which are formed passages or openings 26, 27, 28. The wall 25 is engaged by tongue portions thereof in guide grooves 29. Horizontal support or spacer members 30, 31, 32 are also maintained by tongue portions thereof in other guide grooves 33. These members serve to transmit to steel reinforcements 34 a pressure which develops inside the mould and must be withstood by the wall structures the thickness of which is only for example 6 mm. A pipe 35 for discharging water of condensation is directly connected to the element for injecting steam and the water of condensation which arrives therein from the double chambers by way of an opening 36 is discharged to the exterior by way of an outlet 37. The elements are fixed to the support frame 34 by a fixing device 38. The distributing chamber is provided with steam connections 39 and 40.

I claim:

1. A moulding box for moulding a structure from a mass of an expansible thermoplastic material in the form of small particles which are welded together or agglomerated into a homogeneous mass by heating them to their softening point, or above this point, by injection into the mass of superheated steam having a low content of water of condensation, the moulding box comprising a plurality of mould wall structures defining a mould cavity for the mass; at least one substantially vertical wall structure of said wall structures comprising a plurality of box-shaped hollow elements and means for holding the hollow elements assembled, each hollow element comprising in combination: an inner wall which partly defines said cavity, means defining apertures in said inner wall for passage of the steam into the mass, an outer wall in transversely spaced relation to the inner wall, an upper transverse wall and a lower transverse wall interconn-ecting the inner wall and outer wall, means for distributing steam among said apertures and for acting as baffle means for water of condensation, said steam distributing and baffle means comprising means defining a partition wall in spaced relation to and between the inner wall and outer wall, the partition wall defining a first chamber with the outer wall and a second chamber with the inner wall, steam inlet means communicating with the first chamber, outlet means for water of condensation communicating with the first chamber at the bottom of the first chamber and means defining openings in the partition wall, tongue and groove means supportingly engaging the partition wall with the upper wall and lower wall, support members transversely extending from the partition wall to the inner wall and from the partition wall to the outer wall, tongue and groove means connecting the support members to the partition wall, to the inner wall and to the outer wall, the support members defining passages for steam and water of condensation.

* * * * *